US012775167B2

(12) United States Patent
Dilaver et al.

(10) Patent No.: US 12,775,167 B2
(45) Date of Patent: Oct. 27, 2026

(54) HEAD-UP DISPLAY DEVICE FOR A MOTOR VEHICLE

(71) Applicant: VALEO SCHALTER UND SENSOREN GMBH, Bietigheim-Bissingen (DE)

(72) Inventors: Fatih Dilaver, Bietigheim-Bissingen (DE); Karl Simonis, Bietigheim-Bissingen (DE); Oezguer Salmanoglu, Bietigheim-Bissingen (DE); Daniel Kuntze, Bietigheim-Bissingen (DE); Joachim Rath, Bietigheim-Bissingen (DE); Juergen Schwaderer, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 257 days.

(21) Appl. No.: 18/700,934

(22) PCT Filed: Oct. 10, 2022

(86) PCT No.: PCT/EP2022/078049
§ 371 (c)(1),
(2) Date: Apr. 12, 2024

(87) PCT Pub. No.: WO2023/061912
PCT Pub. Date: Apr. 20, 2023

(65) Prior Publication Data

US 2024/0411130 A1 Dec. 12, 2024

(30) Foreign Application Priority Data

Oct. 12, 2021 (DE) ..................... 10 2021 126 357.3

(51) Int. Cl.
*G02B 27/01* (2006.01)
*B60K 35/23* (2024.01)
*B60K 35/231* (2024.01)

(52) U.S. Cl.
CPC .......... *G02B 27/0101* (2013.01); *B60K 35/23* (2024.01); *B60K 35/231* (2024.01); *B60K 2360/23* (2024.01)

(58) Field of Classification Search
CPC ................ G02B 27/0101; B60K 35/23; B60K 35/231; B60K 2360/23
(Continued)

(56) References Cited

U.S. PATENT DOCUMENTS

2016/0070102 A1* 3/2016 Takamatsu ......... G02B 27/0101 359/631
2016/0306169 A1* 10/2016 Nambara ............... G02B 27/01
(Continued)

FOREIGN PATENT DOCUMENTS

| | | | |
|---|---|---|---|
| DE | 102018126476 | A1 | 4/2020 |
| DE | 10 2009 011 908 | B4 | 12/2021 |
| EP | 3528043 | A1 | 8/2019 |
| JP | 2016075760 | A | 5/2016 |
| WO | 2021132556 | A1 | 7/2021 |

OTHER PUBLICATIONS

International Search Report Issued in Corresponding PCT Application No. PCT/EP2022/078049, dated Jan. 24, 2023. (6 Pages with English Translation).
(Continued)

*Primary Examiner* — Sharrief I Broome
(74) *Attorney, Agent, or Firm* — Osha Bergman Watanabe & Burton LLP

(57) ABSTRACT

An apparatus is presented for precise positioning of an image creation unit relative to a housing part, to reduce distortion of an image projected onto a light transmissive projection surface, such as a vehicle windshield. The appa-
(Continued)

ratus includes the housing part in which an image creation unit of the display apparatus is arranged, and the illumination device, by means of which light is applied to the image creation unit. A holding device is secured to the housing part in the region of the illumination device. The image creation unit is retained on the holding device.

10 Claims, 3 Drawing Sheets

(58) Field of Classification Search
USPC .......................................................... 359/630
See application file for complete search history.

(56) References Cited

U.S. PATENT DOCUMENTS

| | | | | |
|---|---|---|---|---|
| 2019/0146218 | A1* | 5/2019 | Yamazoe | G02B 27/0101 359/631 |
| 2020/0159013 | A1* | 5/2020 | Hirata | B60K 35/28 |
| 2021/0141218 | A1* | 5/2021 | Grandclerc | G02F 1/133606 |

OTHER PUBLICATIONS

Written Opinion of the International Reseach Authority issued in corresponding PCT Application No. PCT/EP2022/078049, dated Jan. 24, 2023. (6 Pages).
Search Report issued in Corresponding German Application No. 10 2021 126 357.3, dated May 25, 2022, (6 Pages).

* cited by examiner

HEAD-UP DISPLAY DEVICE FOR A MOTOR VEHICLE

The invention relates to a head-up display apparatus for a motor vehicle, having a housing part in which an image creation unit of the display apparatus is arranged. The image creation unit is designed to provide an image which can be projected onto a light-transmissive projection surface. Light can be applied to the image creation unit by means of an illumination device of the head-up display apparatus.

DE 10 2009 011 908 A1 describes a head-up display having an image creation device for creating an image and having an optical system for projecting the image into a windshield of a vehicle. The head-up display comprises a light system for illuminating the image creation device. The light system comprises light sources, downstream of which there is a light-mixing geometry. On its inner side, the light-mixing geometry comprises reflective boundary surfaces that serve to mix the light from the light sources. The intention of this is to obtain more efficient backlighting of the image creation device.

Even in the case of such a head-up display apparatus it is a challenge to keep mechanical tolerances as small as possible. This is because inaccurate positioning of the image creation unit in a housing on account of tolerances leads to a low quality of the image seen by the user gazing at the light-transmissive projection surface. Should the head-up display apparatus be installed in the motor vehicle, the user of the display apparatus can be the driver of the motor vehicle in particular.

Inaccuracies in view of the positioning of the image creation unit may lead to, for instance, a distortion of the image created by the image creation unit. This is disadvantageous. To compensate for such inaccuracies, it is possible for example for an emergence opening, through which the image created by the image creation unit reaches the light-transmissive projection surface, to be made larger than would be required if smaller tolerances were present. In addition or in an alternative, at least one mirror of the display apparatus which reflects the image created by the image creation unit toward the projection surface can have a larger embodiment than what would be provided for in the case of smaller tolerances. Such measures are disadvantageous in view of the installation space requirements.

Moreover, inaccuracies when positioning the image creation unit necessitate complex checks of the display apparatus by means of a camera following the installation of the head-up display apparatus into the motor vehicle. Moreover, individual countermeasures need to be taken in response to a possibly occurring distortion of the image. Such a calibration, too, is linked to great outlay.

It is an object of the present invention to develop a head-up display apparatus of the type set forth at the outset, in which particularly precise positioning of the image creation unit is achieved relative to the housing part.

This object is achieved by a head-up display apparatus having the features of claim 1. Advantageous embodiments with expedient developments of the invention are specified in the dependent claims and in the following description.

The head-up display apparatus according to the invention for a motor vehicle comprises a housing part in which an image creation unit of the display apparatus is arranged. The image creation unit is designed to provide an image which is projectable onto a light-transmissive projection surface. The head-up display apparatus comprises an illumination device, by means of which light can be applied to the image creation unit. A holding device is secured to the housing part in the region of the illumination device, with the image creation unit being retained on the holding device.

Consequently, the image creation unit is directly retained in position or positioned by means of the holding device, with the holding device in turn being secured to or affixed on the housing part. Particularly precise positioning of the image creation unit relative to the housing part is achieved as a result of directly securing or retaining the image creation unit on the holding device or by means of the holding device. Additionally, a corresponding tolerance chain is comparatively short because no further components are arranged between the image creation unit and the holding device. As a result, it is possible to particularly comprehensively avoid inaccuracies when positioning the image creation unit relative to the housing part.

Thus, the image provided by the image creation unit during the operation of same is advantageously placed at a specified position. As a result, it is possible to particularly comprehensively avoid distortions in the image provided by the image creation unit during the operation of same. As a further consequence, it is possible to avoid a calibration of the respective head-up display apparatus following the assembly or installation thereof in the motor vehicle. Therefore, the outlay accompanying a corresponding check and calibration of the head-up display apparatus is very comprehensively avoided.

Additionally, backlighting of the image creation unit by the light emitted by the illumination device during the operation of same is improved because the holding device is moreover positioned precisely relative to the illumination device. Moreover, there is no need to provide a multiplicity of components for the purpose of affixing firstly the image creation unit and secondly the illumination device, in each case relative to the housing part. Instead, the holding device assumes the function of affixing the image creation unit relative to the housing part. Additionally, the holding device arranged in the region of the illumination device, in particular arranged in front of the illumination device in the direction of light emission by the illumination device, advantageously ensures very accurate and well reproducible positioning of the image creation unit relative to the illumination device.

Thus, in particular, a shortening of the tolerance chain and hence a reduction in the tolerances present overall are achieved in the case of the head-up display apparatus since the optical components of the image creation unit are referenced to the holding device which retains the image creation unit.

Greater precision is achieved when positioning the image creation unit on account of the smaller tolerances or the shortened tolerance chain. Consequently, it is also possible to use a particularly large area of the image creation unit for the provision of the image. This is accompanied by an improved quality of the virtual image which is projected onto the light-transmissive projection surface during the operation of the head-up display apparatus. This is because the surface of the image creation unit providing the image can be used very effectively, and in particular can be exploited particularly comprehensively.

In order to simplify matters in the present case, the head-up display apparatus in the form of a head-up display is also referred to merely as display apparatus in synonymous fashion. During the operation of the display apparatus, the image provided by the image creation device can be projected onto a light-transmissive projection surface in the form of a windshield of the motor vehicle. Furthermore, it is possible to project the image onto a pane designed as a so-called combiner that is light-transmissive and reflects the image and is designed as a separate component part from the windshield of the motor vehicle. It is advantageous in both cases that the quality of the very largely distortion-free image, which is provided by the correctly and precisely positioned image creation unit during the operation of the display apparatus, is particularly high.

Preferably, the image creation unit comprises a pane arrangement which is in direct contact with the holding device and retained by means of the holding device. It is advantageous in this case that it is possible to make do without a frame or a diaphragm which is usually provided in an image creation unit comprising a pane arrangement with at least two panes. The tolerances are reduced particularly comprehensively or the tolerance chain is very much shortened by virtue of such a frame or such a diaphragm not being in immediate contact with the holding device but rather the pane arrangement, which preferably comprises the at least two light-transmissive panes, directly contacting the holding device.

By contrast, if it is not the at least one pane of the pane arrangement but the frame or the diaphragm that is in direct or immediate contact with the holding device, then there are additional tolerances which are caused by the presence of the frame or the diaphragm which encloses the at least one pane. Particularly direct positioning of the image creation unit on the holding device and, via the holding device, on the housing part is achieved by virtue of the holding device directly or immediately contacting the at least one pane of the pane arrangement. This is particularly advantageous in view of the precise positioning of the image creation unit relative to the housing part.

By preference, at least one holding arm of the holding device rests against an upper narrow side of the pane arrangement in terms of the vertical direction of the display apparatus. Thus, the at least one holding arm ensures a particularly precise positioning of one of the narrow sides of the pane arrangement relative to the housing part.

This applies especially if the holding arm exerts a pressure on the upper narrow side of the pane arrangement, for instance by virtue of the holding arm being prestressed by means of a spring or the like. Thus, the holding arm may apply a compressive force to the upper narrow side, and this is conducive to a particularly secure hold of the pane arrangement.

This can also particularly comprehensively suppress a movement of the pane arrangement relative to the holding device. This is especially important if oscillations or vibrations, which are introduced into the housing part and hence also into the holding device, occur during the driving operation of the motor vehicle equipped with the head-up display apparatus.

In addition or in an alternative, provision can be made for a lower narrow side of the pane arrangement in terms of the vertical direction of the display apparatus to rest on at least one support element of the holding device, with the lower narrow side being supported by means of the at least one support element. Advantageously, a precise rest for the pane arrangement of the holding device is provided by the at least one support element. This is also conducive to precise positioning of the image creation unit relative to the housing.

If the holding device comprises both the at least one holding arm and the at least one support element then the pane arrangement of the image creation unit is particularly reliably and reproducibly positioned in the vertical direction of the display apparatus.

Preferably, the holding device comprises a plurality of abutment points, against which a back side of the pane arrangement facing the illumination device rests. For example, the pane arrangement may comprise a pane package comprising two light-transmissive panes, with the rearward pane, i.e. the pane facing the illumination device, resting against the abutment points. Such abutment points ensure precise positioning of the pane arrangement across, in particular perpendicular to, a planar extent of the pane arrangement. This is also advantageous in view of the precise positioning of the image creation unit relative to the housing part.

It was also found to be advantageous if the holding device comprises a stop element against which a lateral narrow side of the pane arrangement in terms of a vertical direction of the display apparatus is pressed. In this case, the holding device comprises a spring element on a side opposite the stop element, said spring element applying a pressure directed at the stop element to a further lateral narrow side of the pane arrangement. As a result of an interaction of the spring element with the stop element, it is possible to obtain a very precise and well reproducibly settable positioning of the pane arrangement, especially in a transverse direction of the display apparatus, i.e. perpendicular to the vertical direction. Moreover, the interaction of the spring element with the stop element ensures a jerk-free retention of the pane arrangement on or by means of the holding device.

By preference, the holding device comprises a holding frame, with a chamber of the display apparatus being delimited by the holding frame and by a carrier part, on which at least one light source of the illumination device is arranged. In this case, the image creation unit is arranged in front of a front-side light emergence opening of the chamber. This moreover achieves a very precise positioning of the image creation unit relative to the light sources of the illumination device. Moreover, the holding frame can advantageously be used for the retention of further components of the display apparatus. This provides particularly varied potential uses for the holding frame.

By preference, a diffuser element designed to scatter the light emitted by the illumination device during the operation of the illumination device is retained by means of the holding device. What this can achieve is a very uniform application of light to the image creation unit during the operation of the illumination device. This is advantageous in view of good recognizability and a high quality of the image provided by the image creation unit during the operation of same.

For example, a panel or pane formed from a light-transmissive plastic, in particular a light diffuser, can be used as diffuser element. Moreover, an extended functionality of the holding device is provided on account of the arrangement of the diffuser element on the holding device. This is because the holding device serves firstly as diffuser holder and secondly for directly retaining the image creation unit.

By preference, the light emergence opening of the chamber is sealed by means of the diffuser element. This prevents an unwanted ingress of dirt into the chamber via the light emergence opening. Moreover, the diffuser element ensures that all of the light leaving the chamber through the front-side light emergence opening is scattered by means of the diffuser element.

By preference, the chamber is designed to reflect light on the inner side and/or provided with a reflector device on the inner side. This ensures that a particularly large extent of the light emitted by the illumination device during the operation of same reaches the light emergence opening of the chamber, in front of which the image creation unit is arranged. This is accompanied by a high light yield.

Moreover, what is achieved on account of arranging the reflector device or the light-reflective regions of the chamber on the holding device is that such a reflector is positioned very precisely relative to the image creation unit. This is conducive to an improved illumination or backlighting of the image creation unit by means of the illumination device.

By preference, at least an end region of the holding device is engaged with a carrier part of the illumination device. This achieves very precise positioning of the holding device relative to the illumination device. For example, the at least one end region of the holding device may engage in a cutout formed in the carrier part.

At least one light source of the illumination device may be arranged on the carrier part of the illumination device, said carrier part being in the form of a printed circuit board in particular. By preference, the carrier part is secured to the housing part, in particular by screwing the carrier part onto the housing part. It is advantageous for precise positioning of the holding device relative to the housing part if, moreover, the at least one end region of the holding device engages with the carrier part.

By preference, the holding device comprises two holding lugs which are formed in one piece with a main body of the holding device. In this case, the holding device is secured to the housing part by way of the holding lugs. The one-piece design of the holding lugs with the main body of the holding device is advantageous in view of very precise positioning of the holding device on the housing part. In turn, this is conducive to the precise positioning of the image creation unit relative to the housing part.

In particular, respective screws can be guided through passage openings formed in the holding lugs for the purpose of securing the holding device to the housing part. Such screwing of the holding device onto the housing part achieves a particularly secure and positionally accurate fixation of the holding device on the housing part.

By preference, the image creation unit is in the form of a liquid crystal electronic visual display. In particular, the liquid crystal electronic visual display can be in the form of an active matrix display which contains a matrix of thin-film transistors. In this case, the matrix of thin-film transistors can be arranged between two light-transmissive panes of a pane arrangement of the liquid crystal electronic visual display. Very precise positioning of the liquid crystal electronic visual display relative to the housing part can be achieved on account of direct retention of the panes of the pane arrangement on the holding device, especially in the case of such a configuration of the image creation unit.

The features and combinations of features mentioned above in the description and the features and combinations of features mentioned below in the description of the figures and/or shown in the figures alone may be used not only in the respectively indicated combination but also in other combinations without departing from the scope of the invention. Embodiments of the invention that are not explicitly shown and explained in the figures, but emerge and are producible from the explained embodiments by virtue of separate combinations of features, should therefore also be regarded as included and as disclosed. Embodiments and combinations of features that therefore do not have all the features of an originally formulated independent claim should also be regarded as disclosed. Furthermore, embodiments and combinations of features, in particular by way of the embodiments outlined above, that go beyond or deviate from the combinations of features outlined in the back references of the claims should be regarded as disclosed.

Further features of the invention can be found in the claims, the figures, and the description of the figures. In the figures:

Figure 1:
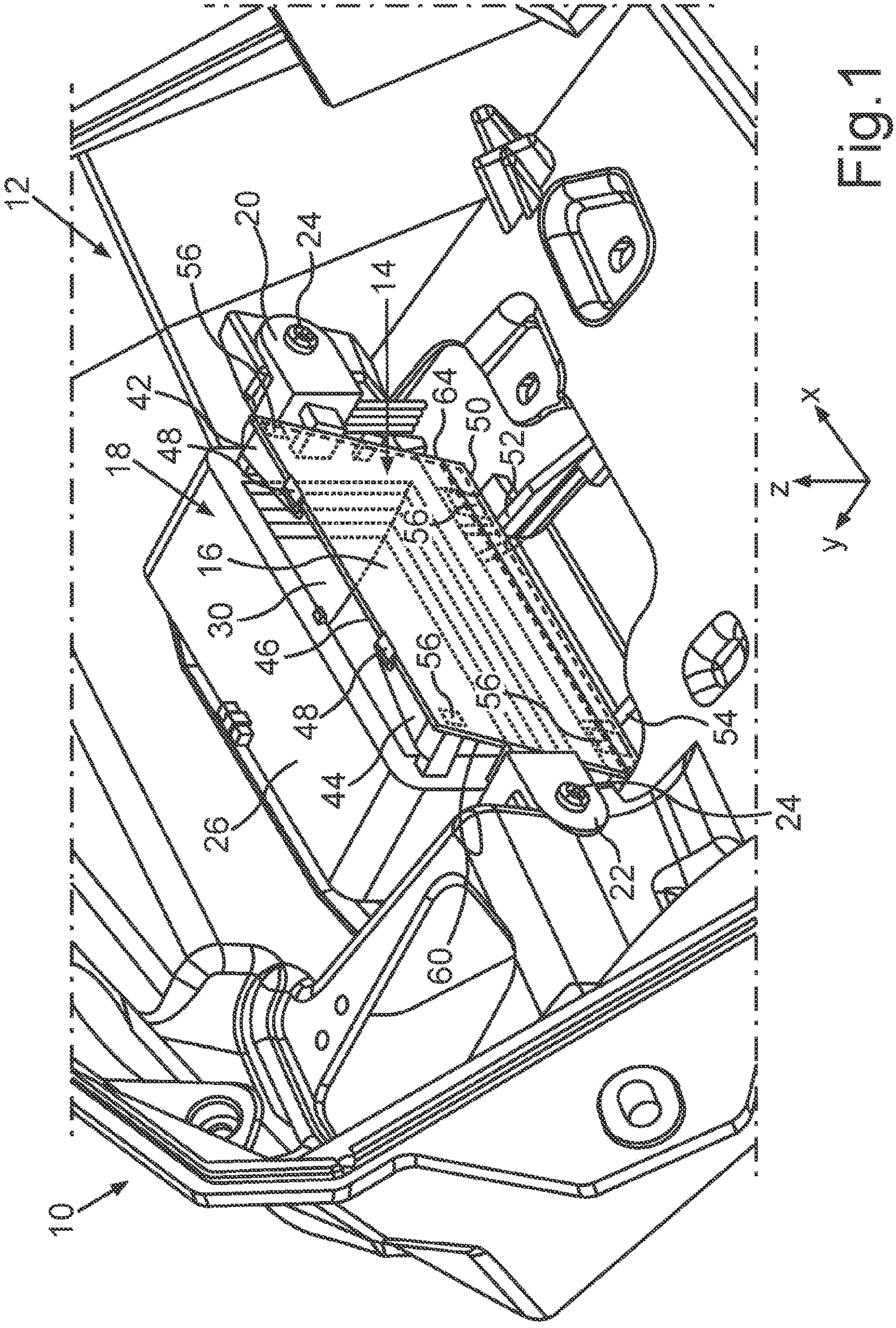
FIG. 1 shows, in perspective and in sections, components of a head-up display apparatus for a motor vehicle, wherein a holding device secured to a housing part of the display apparatus directly retains a pane arrangement of an image creation unit of the head-up display apparatus.

FIG. 1 shows sections of a housing part 12 of a head-up display apparatus for a motor vehicle, said head-up display apparatus, for reasons of simplicity, also merely being referred to as a display apparatus 10 below. In relation to an installed position of the display apparatus 10 in the motor vehicle, the housing part 12 is a lower housing part 12 of the display apparatus 10 in the present case.

An upper housing part (not shown) of the display apparatus 10 is arranged on the lower housing part 12 when the display apparatus 10, which is also referred to as a head-up display, is in the state where it is installed in the motor vehicle (not shown). The upper housing part has an emergence opening which is provided with a light-transmissive film or a similar covering and by means of which an image can be projected onto a light-transmissive projection surface. For example, the windshield of the motor vehicle can serve as this light-transmissive projection surface.

The image projected onto the projection surface is provided by an image creation unit 14 of the display apparatus 10. In the present case, the image creation unit 14 is in the form of an active matrix display with thin-film transistors and can therefore also be referred to as a TFT (thin-film transistor) display.

The image creation unit 14 comprises a pane arrangement 16 which has two panes (not shown in detail in the present case), in particular glass panes, and the thin-film transistors arranged between the two panes. In the present case, the pane arrangement 16 is retained directly on a holding device 18, which in turn is secured to the housing part 12.

For this purpose, the holding device 18 may comprise two holding lugs 20, 22, by means of which the holding device 18 is secured to the housing part 12. In the present configuration of the display apparatus 10 shown by way of example, respective screws 24 are guided through passage openings formed in the holding lugs 20, 22 (compare FIG. 2).

The holding device 18 also comprises a holding frame 26 which delimits a chamber 28 (compare FIG. 2) of the display apparatus 10 in the circumferential direction. As shown by way of example in the present case, a reflector device or a reflector 30 may be arranged in the chamber 28 which is formed or delimited in regions by the holding frame 26 of the holding device 18.

The reflector 30 ensures a high light yield when operating an illumination device 32 (compare FIG. 2) of the display apparatus 10. In the present case, the illumination device 32 is provided or designed to provide backlighting for the image creation unit 14. Accordingly, during the operation of the display apparatus 10, light emitted by light sources of the illumination device 32 is applied to the image provided by means of the image creation unit 14.

Figure 2:
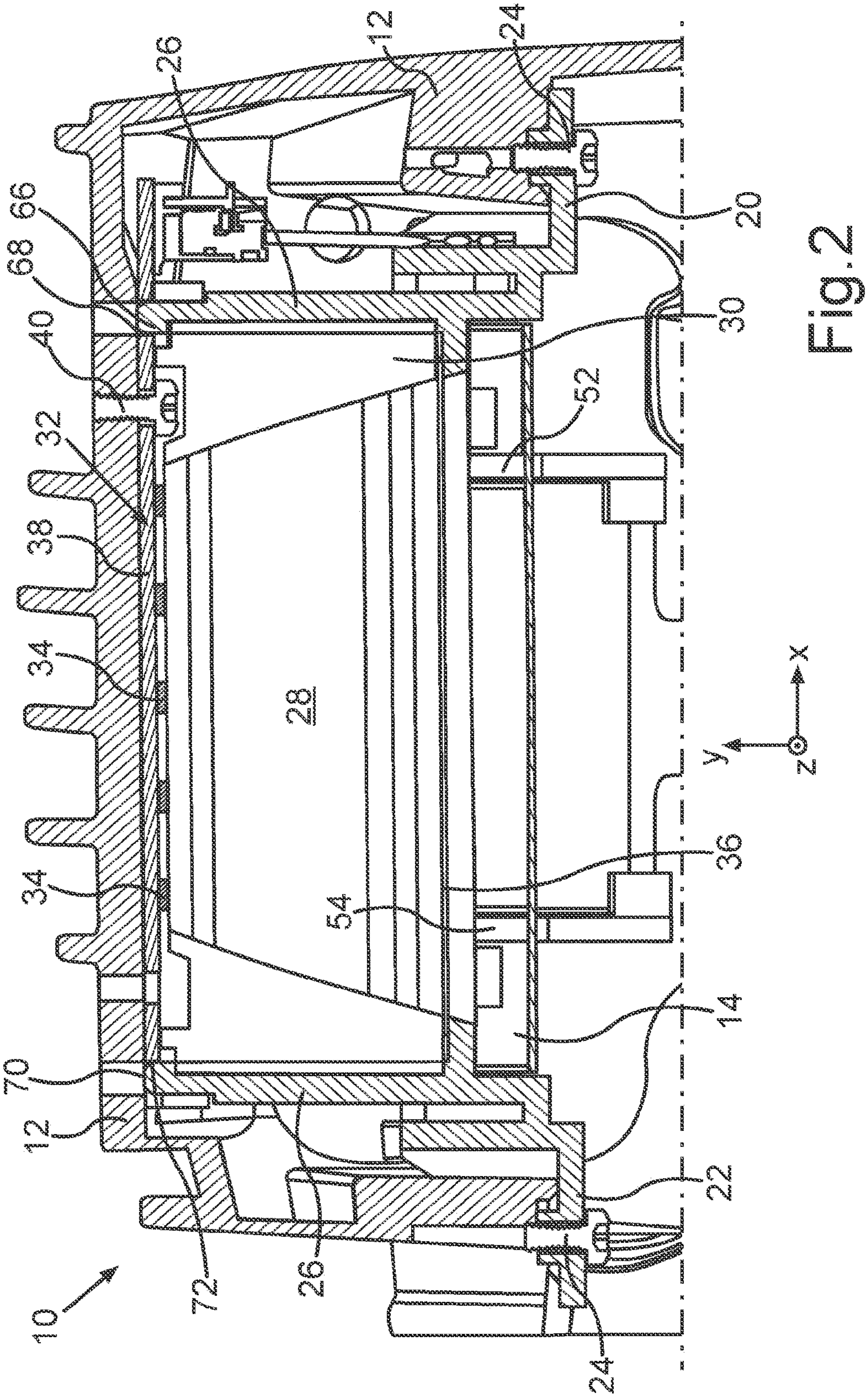
FIG. 2 shows the display apparatus according to FIG. 1 in a partly cut-open plan view.

In this respect, light sources in the form of light-emitting diodes 34 are shown schematically in FIG. 2, only some of which have been provided with a reference sign for reasons of clarity. On account of the provision of the reflector 30 arranged on an inner side of the holding frame 26 (compare FIG. 2), the light emitted by the light-emitting diodes 34 is used to a particularly large extent for the purpose of applying light to, or providing backlighting for, the image creation unit 14.

Moreover, a diffuser element or a diffuser 36, shown in section in FIG. 2, can be arranged on the path of the light from the light sources, presently in the form of the light-emitting diodes 34, to the image creation unit 14. In particular, the diffuser 36, for example designed as a light-transmissive plastic panel, or such a light diffuser ensures a uniform impingement of light emitted by the light-emitting diodes 34 upon the image creation unit 14.

Since the diffuser 36 is retained on the holding device 18 in the case of the display apparatus 10 presently shown by way of example, the holding device 18 can be referred to as a diffuser holder in the present case. In the case of this display apparatus 10, the light-transmissive diffuser 36 seals or covers a front-side light emergence opening of the chamber 28 delimited by the holding frame 26 in the circumferential direction (compare FIG. 2).

In the rearward direction or on a back side, the chamber 28 is delimited by a carrier part in the form of a printed circuit board 38, on which the light sources, presently in the form of the light-emitting diodes 34, are retained (compare FIG. 2). The printed circuit board 38 therefore serves as a carrier part for the light sources of the illumination device 32. Just like the holding device 18, the printed circuit board 38 is presently also screwed to the housing part 12 by means of at least one screw 40 (compare FIG. 2).

The image provided by the image creation unit 14 during the operation of same is projected via at least one mirror (not shown) through the emergence opening formed in the upper housing part (likewise not shown) of the display apparatus 10 onto the projection surface, for instance in the form of the windshield of the motor vehicle. For example, a mirror of the display apparatus 10 which ensures an enlargement of the image can be used for this projection of the image onto the projection surface.

Especially for this reason, but also in order to project the image onto the projection surface via the emergence opening in a manner that is as free from distortions and as complete as possible, it is advantageous if the image creation unit 14 is positioned very precisely relative to the housing part 12, as is also the case in the presently shown display apparatus 10. This precise positioning of the image creation unit 14 is achieved by the holding device 18, and this is explained in detail below.

Firstly, it is evident, especially from FIG. 1, that the pane arrangement 16 of the image creation unit 14, i.e. the pane package presently comprising two panes, is in immediate contact with the holding device 18 or directly retained on the holding device 18.

This is because, unlike in the case of the image creation unit 14 shown presently in exemplary fashion, there are TFT displays which have frame-shaped diaphragms which enclose the pane arrangement or the pane package. In this context, a diaphragm or a diaphragm-shaped frame can be arranged in particular on a front side of the pane package and also on a back side of the pane package. However, if such diaphragm-type frames are retained on a holding device, additional tolerances which are due to the arrangement of the pane arrangement 16 relative to the frame must be taken into account in view of the positioning of the pane arrangement 16.

However, such frames or diaphragms have been dispensed with in the present case. Accordingly, the pane arrangement 16 is retained directly or immediately on the holding device 18. In particular, the holding device 18 is immediately in contact with at least one pane of the pane arrangement 16 or pane package. A particularly short tolerance chain is achieved as a result. This leads to very precise or accurate positioning of the pane arrangement 16 and hence the optically effective components of the image creation unit 14, optically effective as they provide the image, relative to the housing part 12 of the display apparatus 10.

A particular advantage of the present frameless pane arrangement 16 is that it enables a direct retention and positioning of the image creation unit 14 on the holding device 18 designed as a diffuser holder in the present case. This positioning of the image creation unit 14 relative to the housing part 12 is maintained precisely, independently of possible tolerances which may afflict the arrangement of the display apparatus 10 in the motor vehicle. Therefore, it is possible to achieve a precise projection of an image, provided or created at least largely without distortions, onto the light-transmissive projection surface by means of the display apparatus 10.

Advantageously, in addition, the holding device 18 in the form of the diffuser holder also positions the reflector 30 and the image creation unit 14 very precisely relative to one another. This ensures particularly good backlighting for the assembled image creation unit 14 during the operation of the display apparatus 10.

In the present case, two holding arms 42, 44, emanating from the holding frame 26, are arranged in an upper region of the holding device 18. The two holding arms 42, 44 are spaced apart from one another in a transverse direction x of the display apparatus 10, which just like a vertical direction z of the display apparatus 10 and a depth direction y of the display apparatus 10 is illustrated by a coordinate system in FIG. 1.

In the present case, the holding arms 42, 44 exert a pressure on an upper narrow side 46 of the pane arrangement 16 in terms of the vertical direction z. For this purpose, respective lugs 48 of the holding arms 42, 44 rest directly against the upper narrow side 46 of the pane arrangement 16. A lower narrow side 50 of the pane arrangement 16, opposite the upper narrow side 46 in the vertical direction z, by contrast rests on two support elements 52, 54 which are formed in one piece with a main body of the holding device 18, just like the holding arms 42, 44 presently designed in resilient or spring-loaded fashion.

By virtue of the pane arrangement 16 being clamped between the presently resilient holding arms 42, 44 and the support elements 52, 54 in the vertical direction z, the pane arrangement 16 is mounted with great positional accuracy on the holding device 18 in the vertical direction z.

In the present case, the lugs 48 of the holding arms 42, 44 are spaced apart further from the diffuser 36 in the depth direction y of the display apparatus 10 or chamber 28 than abutment points of the support elements 52, 54, which are spaced apart from one another in the transverse direction x and against which the lower narrow side 50 of the pane arrangement 16 rests. In the present case, this leads to the pane arrangement 16 being oriented with an incline relative to the diffuser 36 while the diffuser 36 substantially extends in the vertical direction z and the transverse direction x. This inclined orientation of the pane arrangement 16, which is depicted partly cut open in FIG. 2, of the image creation unit 14 with respect to the xz-plane is also identifiable in FIG. 2.

It is also evident from FIG. 2 that a rearward end region 66 of the holding frame 26 may be introduced or engaged in a cutout 68 which is formed in the printed circuit board 38. The rearward end region 66 of the holding frame 26 can be designed to taper toward the printed circuit board 38 for this purpose, as is also evident from FIG. 2. Such interaction between the holding frame 26 and the printed circuit board 38 is advantageous in view of precise positioning of the holding device 18 relative to the illumination device 32.

A further end region 70 of the holding frame 26 can rest against a narrow side 72 of the printed circuit board 38 on a side of the holding frame 26 opposite to the end region 66 in the transverse direction x. However, provision can also be made for the further end region 70 to engage in a cutout formed in the printed circuit board 38, in a manner analogous to what was described for the first end region 66.

From FIG. 1 in particular, it is evident that the holding device 18 comprises a plurality of abutment points 56, against which a back side of the pane arrangement 16 facing the illumination device 32 rests. In the present case, the abutment points 56 are arranged in the vicinity of respective corner regions of the pane arrangement 16 presently designed in rectangular fashion (compare FIG. 1).

The two upper abutment points 56 in the vertical direction z are provided by the holding arms 42, 44 in the present case. By contrast, the two lower abutment points 56 in the vertical direction z are presently arranged adjacent to the support elements 52, 54. If the pane arrangement 16 rests against these abutment points 56 then very precise positioning of the pane arrangement 16 is also obtained in the depth direction y of the display apparatus 10.

Figure 3:
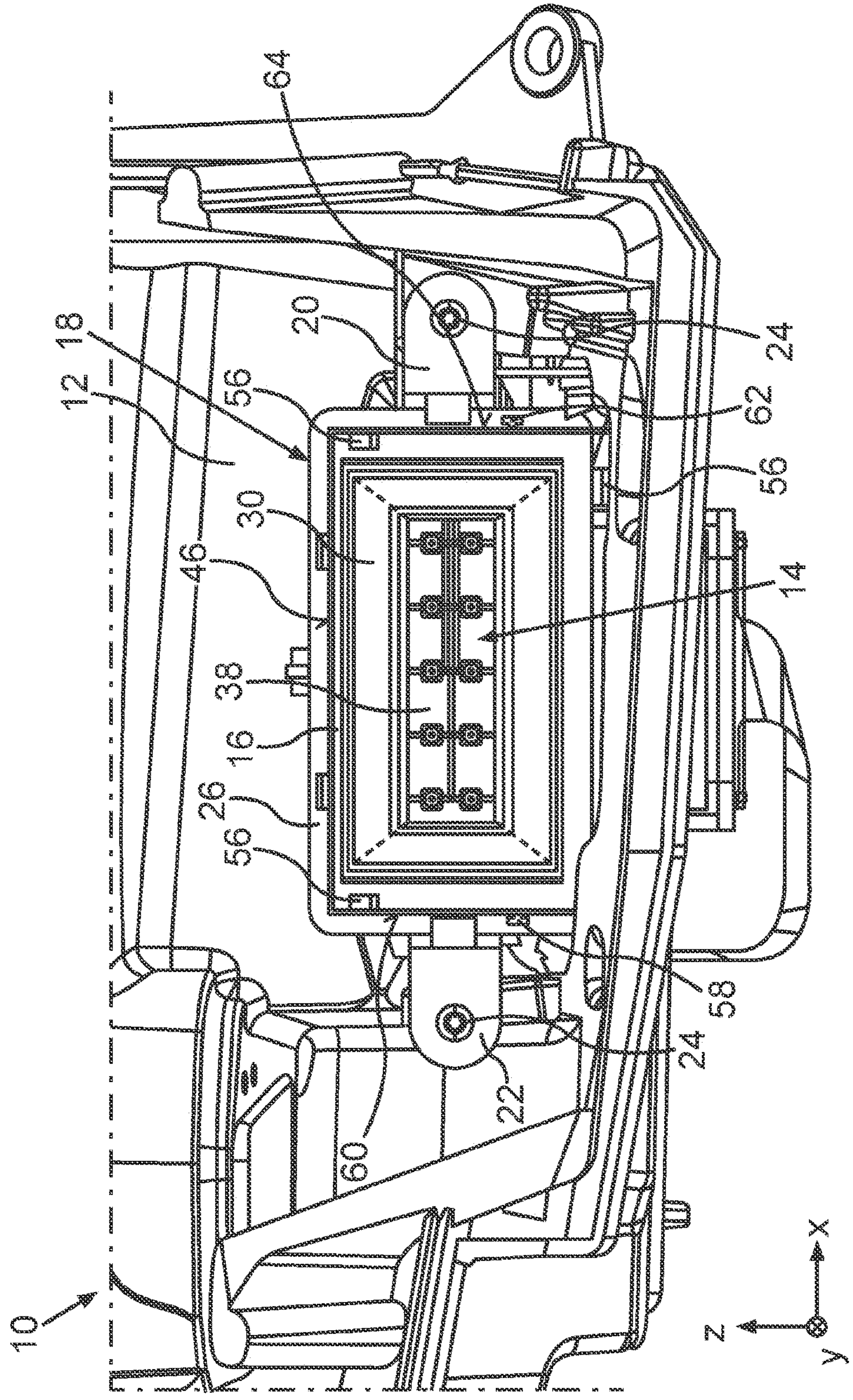
FIG. 3 shows, in perspective and in sections, the display apparatus according to FIG. 1 in a frontal view of a front side of the pane arrangement.

FIG. 3 shows the two upper abutment points 56 in a frontal view. Moreover, it is quite evident, especially from FIG. 3, how precise and positionally accurate retention of the pane arrangement 16 of the image creation unit 14 in the present case is additionally achieved in the transverse direction x by the holding device 18. This is because the holding device 18 firstly comprises a stop element 58, against which a lateral narrow side 60 (compare FIG. 1) of the pane arrangement 16 is pressed.

In this case, the pressure is exerted by a spring element 62 of the holding device 18, said spring element being opposite the stop element 58 in the transverse direction x. The spring element 62 applies a pressure directed at the stop element 58 on a further lateral narrow side 64 (compare FIG. 1) of the pane arrangement 16. A very precise retention of the pane arrangement 16 on the holding device 18 is also achieved in the transverse direction x by virtue of the spring element 62 pressing the pane arrangement 16 against the stop element 58. Moreover, both the stop element 58 and the spring element 62 rest immediately against the at least one pane of the pane arrangement 16.

Overall, the examples show how it is possible to provide a head-up display apparatus 10 or a head-up display with a particularly comprehensively shortened tolerance chain in relation to the positioning of the image creation unit 14.

The invention claimed is:

1. A head-up display apparatus for a motor vehicle, the head-up display comprising:

a housing part in which an image creation unit of the display apparatus is arranged, wherein the image creation unit is configured to provide an image which is projectable onto a light-transmissive projection surface, and an illumination device, by which light is applied to the image creation unit, wherein a holding device is secured to the housing part in the region of the illumination device, wherein the image creation unit is retained on the holding device, wherein the holding device comprises a holding frame, wherein a chamber of the display apparatus is delimited by the holding frame and by a carrier part, on which at least one light source of the illumination device is arranged, and wherein the image creation unit is arranged in front of a front-side light emergence opening of the chamber.

2. The head-up display apparatus as claimed in claim 1, wherein the image creation unit comprises a pane arrangement which is in direct contact with the holding device and retained by means of the holding device.

3. The head-up display apparatus as claimed in claim 2, wherein at least one pressure-exerting holding arm of the holding device rests against an upper narrow side of the pane arrangement in terms of the vertical direction of the display apparatus, or wherein a lower narrow side of the pane arrangement in terms of the vertical direction of the display apparatus rests on at least one support element of the holding device and is supported by means of the at least one support element.

4. The head-up display apparatus as claimed in claim 2, wherein the holding device comprises a plurality of abutment points, against which a back side of the pane arrangement facing the illumination device rests.

5. The head-up display apparatus as claimed in claim 2, wherein the holding device comprises a stop element against which a lateral narrow side of the pane arrangement in terms of a vertical direction of the display apparatus is pressed, with the holding device comprising a spring element on a side opposite the stop element, wherein the spring element applies a pressure directed at the stop element to a further lateral narrow side of the pane arrangement.

6. The head-up display apparatus as claimed in claim 1, wherein a diffuser element configured to scatter the light emitted by the illumination device during the operation of the illumination device is retained by means of the holding device.

7. The head-up display apparatus as claimed in claim 6, wherein the light emergence opening of the chamber is sealed by means of the diffuser element, wherein the chamber is configured to reflect light on the inner side or is provided with a reflector device on the inner side.

8. The head-up display apparatus as claimed in claim 1, wherein at least an end region of the holding device is engaged with a carrier part of the illumination device that is secured to the housing part.

9. The head-up display apparatus as claimed in claim 1, wherein the holding device comprises two holding lugs which are formed in one piece with a main body of the holding device, wherein the holding device is secured to the housing part by means of respective screws which are guided through passage openings formed in the holding lugs.

10. The head-up display apparatus as claimed in claim 1, wherein the image creation unit is in the form of a liquid crystal electronic visual display.

* * * * *